United States Patent Office 3,351,583
Patented Nov. 7, 1967

3,351,583
PREPARATION OF HYDROXYPROPYL
CELLULOSE
Robert G. Bishop, Hopewell, Va., assignor to Hercules Incorporated, a corporation of Delaware
No Drawing. Filed July 6, 1964, Ser. No. 380,608
13 Claims. (Cl. 260—231)

The present invention relates to a process of preparing cellulose ethers and more particularly to a slurry process of preparing hydroxypropyl cellulose wherein a water immiscible dispersant or a water miscible—water immiscible mixed dispersant is employed.

Copending application Ser. No. 257,064, now Patent No. 3,278,521, filed on Feb. 8, 1963 in the name of Eugene D. Klug as inventor and entitled, "Hydroxypropyl Cellulose and Process," discloses and claims a novel hydroxypropyl cellulose and process of making. Copending application Ser. No. 257,061, now Patent No. 3,278,520, filed on Feb. 8, 1963 in the name of Eugene D. Klug as inventor, and entitled, "Hydroxypropyl Cellulose and Process," discloses and claims another process of making a novel hydroxypropyl cellulose product of Ser. No. 257,064. Surprisingly, the hydroxypropyl cellulose of said copending applications is characterized by the following desirable properties:
 (1) Soluble in cold water.
 (2) Insoluble in hot water.
 (3) Thermoplastic
 (4) Soluble in a large number of polar organic solvents.
 (5) Low equilibrium moisture content.

Although the desirablility of the properties listed hereinbefore of the hydroxypropyl cellulose involved in the present invention are probably obvious, the significance of the hot water-insoluble property should be emphasized. Insolubility in hot water is a distinct and important advantage in that it permits purification with hot water to a low ash content as compared with purification with aqueous organic liquids which not only have the disadvantage of being far more expensive but they complicate the process because they must be recovered. Furthermore, even with large amounts of organic solvents, an ash content as low as with hot water cannot be obtained.

The process of Ser. No. 257,064 comprises preparing alkali cellulose in an aqueous alkaline water-miscible alcohol (e.g. tertiary butyl alcohol) slurry. After the alkali cellulose period, the excess liquid is filtered off and the alkali cellulose filter cake is etherified either in the presence or absence of a second diluent which is water-immiscible (e.g. hexane). The process of Ser. No. 257,061 comprises preparing alkali cellulose in an aqueous alkaline slurry with liquid propylene oxide diluent. After the alkali cellulose period, the alkali cellulose is etherified (a) in the presence of propylene oxide as diluent and etherifying agent or (b) the excess propylene oxide is filtered off and the alkali celluose is etherified either in the presence or absence of a second diluent which is water-immiscible (e.g. hexane).

In Ser. No. 257,064, it would be a substantial improvement if filtering off the excess liquid between the alkali cellulose period and the etherification step could be eliminated.

In Ser. No. 257,061, it would be a substantial improvement if, instead of the liquid propylene oxide as alkali cellulose diluent, a diluent could be used which would make the process easier to control.

The process of the present invention accomplishes the above-mentioned desired improvements in the processes of Ser. Nos. 257,064 and 257,061 without any sacrifice in the desirable properties of the hydroxypropyl cellulose product set forth hereinbefore, except that in some cases the product may be somewhat less soluble in polar organic solvents.

Some of the prior art refers to the water-miscible and water-immiscible liquids as "diluents" when used as disclosed herein, whereas other prior art uses the term "dispersants." Perhaps the latter is a better term when used in slurry processes, of which the present invention is an example.

For the sake of brevity the following designations will be used sometimes hereinafter: IPA is isopropyl alcohol, TBA is tertiary butyl alcohol, A/C is alkali cellulose, HPC is hydroxypropyl cellulose, Gran. is granularity, PO is propylene oxide, V is very, Sl is slightly.

The purpose of the following paragraph is to explain the use of the terms "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, carboxyalkyl, or acyl derivatives of cellulose, the D.S. and M.S. are the same. For the hydroxyalkyl derivatives of cellulose, the M.S. is generally greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

The properties of aqueous solutions of hydroxypropyl cellulose ethers (referred to in the art and herein as "solution properties") are conventionally measured in terms of granularity, fibers, and turbidity. These properties and processes for determining them are defined hereinafter. Good solution properties are quite important for many uses of hydroxypropyl cellulose ethers. These uses include, e.g. films or coatings, cosmetics, textiles, laundry aids, paper additives, pharmaceuticals, and many uses as thickeners in general.

The following examples, wherein percent and parts are by weight unless otherwise indicated, illustrate various embodiments of the present invention but they are not intended to limit the invention beyond the scope of the appended claims. Temperature, time and the particular manner or order of mixing the materials are not critical, as is well known in the art. Such conditions have been well known in the art for many years and are applicable in the present invention. However, the following represents a typical procedure and this procedure was used in the examples given hereinafter, unless otherwise indicated.

The dispersant, water and aqueous sodium hydroxide solution were added to a reactor. The temperature of the resulting slurry was cooled to the desired A/C temperature, cellulosic material was added and the slurry was held at that temperature for the desired A/C time. Then propylene oxide was added. In some examples no A/C holding time was employed, and in such examples cellulose and propylene oxide were added immediately and the heat rise to etherification temperature was started. The A/C period is the time the slurry is at the desired A/C temperature before starting the etherification. After the A/C period the slurry temperature was raised to carry out the etherification with propylene oxide. The slurry was cooled, the sodium hydroxide neutralized with acid and the resulting hydroxypropyl cellulose product purified with hot water and dried. All viscosities given herein were determined with a standard Brookfield Synchro-Lectric LVF viscometer using 1% solutions of the hydroxypropyl cellulose product in water and ethanol at a temperature of 25° C. Further details appear in Tables 1 and 2 hereinafter.

ride. Applicable water-immiscible dispersants include, e.g., those selected from the group consisting of aliphatic alcohols of 2–4 carbon atoms, e.g. ethanol, n-propanol, isopropanol, n-butanol, sec-butanol, isobutanol, tert-butanol, methyl propyl carbinol, diethyl carbinol, and methyl isopropyl carbinol; dimethyl sulfoxide; dioxane; tetrahydrofuran. Hexane, heptane and toluene are preferred; mixed

TABLE 1.—PREPARATION OF HPC SINGLE DISPERSANT

| Ex. | Dispersant | Process Conditions | | | | | Product Properties | | | | | | | | | |
|---|---|---|---|---|---|---|---|---|---|---|---|---|---|---|---|---|
| | | Ratio to Cellulose | | | | MS | Viscosity, cps. | | Gran. Water | Fibers Water | Turbidity | | A/C | | Etherification | |
| | | Dispersant | NaOH | Water | PO | | Water | EtOH | | | Water | EtOH | Temp. (° C.) | Time (hrs.) | Temp. (° C.) | Time (hrs.) |
| 1 | Hexane | 12 | 0.1 | 0.2 | 3.2 | 4.3 | 1,600 | 210 | 0+ | 2 | Clear | Hazy | 20 | .75 | 75 / 85 | 4 / 6 |
| 2 | Toluene | 10.1 | 0.1 | 0.4 | 3.4 | 4.0 | 1,900 | 1,100 | 0+ | 2 | do | Clear | 20 | .75 | 75 / 85 / 95 | 1 / 1 / 3 |
| 3 | Benzene | 10.1 | 0.1 | 0.4 | 3.4 | 3.6 | 440 | 240 | 0+ | 2 | do | do | 20 | .75 | 75 / 85 / 95 | 1 / 1 / 3 |
| 4 | Xylene | 10.1 | 0.1 | 0.3 | 3.4 | 4.1 | 1,400 | 680 | 0+ | 2 | do | Hazy | 20 | .75 | 75 / 85 / 95 | 1 / 1 / 3 |

TABLE 2.—PREPARATION OF HPC MIXED DISPERSANT

| Ex. | Dispersant | Process Conditions | | | | | Product Properties | | | | | | | | | |
|---|---|---|---|---|---|---|---|---|---|---|---|---|---|---|---|---|
| | | Ratio to Cellulose | | | | MS | Viscosity, cps. | | Gran. Water | Fibers Water | Turbidity | | A/C | | Etherification | |
| | | Dispersant | NaOH | Water | PO | | Water | EtOH | | | Water | EtOH | Temp. (° C.) | Time (hrs.) | Temp. (° C.) | Time (hrs.) |
| 5 | TBA / Hexane | 2.5 / 9.5 | 0.1 | 0.45 | 3.2 | 4.0 | 2,300 | 1,600 | 0+ | 2 | Clear | Clear | 20 | .75 | 75 / 85 / 95 | 2 / 2 / 2 |
| 6 | TBA / Hexane | 1.0 / 11.0 | 0.1 | 0.4 | 3.2 | 4.0 | 2,100 | 150 | 2 | 2 | Hazy | V. hazy | None | None | 75 / 85 | 4 / 6 |
| 7 | TBA / Hexane | 4.0 / 8.0 | 0.1 | 0.4 | 3.2 | 4.1 | 2,100 | 1,300 | 1 | 2 | Clear | Sl. hazy | None | None | 75 / 85 | 4 / 6 |
| 8 | TBA / IPA / Hexane | 2.0 / 9.5 | 0.1 | 0.4 | 3.2 | 3.6 | 2,800 | 280 | 0+ | 2 | do | V. hazy | None | None | 75 / 85 | 4 / 5 |
| 9 | IPA / Hexane | 3.0 / 9.5 | 0.1 | 0.4 | 3.2 | 3.9 | 2,800 | 2,000 | 1 | 2+ | do | Hazy | None | None | 75 / 85 | 4 / 6 |
| 10 | TBA / Toluene | 0.5 / 9.6 | 0.1 | 0.45 | 3.4 | 3.9 | 2,000 | 1,300 | 1 | 2 | do | Clear | 30 | .75 | 75 / 85 / 95 | 1 / 1 / 4 |
| 11 | TBA / Toluene | 2.5 / 9.5 | 0.1 | 0.45 | 3.4 | 4.0 | 1,800 | 1,000 | 0+ | 2 | do | do | 20 | .75 | 75 / 85 | 4 / 6 |
| 12 | TBA / Heptane | 2.3 / 7.8 | 0.1 | 0.4 | 3.4 | 4.3 | 1,100 | 560 | 0+ | 2 | do | do | 30 | .75 | 75 / 85 / 95 | 1 / 1 / 4 |
| 13 | TBA / Xylene | 0.5 / 9.6 | 0.1 | 0.4 | 3.4 | 4.1 | 1,800 | 880 | 1 | 2 | do | do | 30 | .75 | 75 / 85 / 95 | 1 / 1 / 4 |
| 14 | TBA / Xylene | 1.5 / 8.6 | 0.1 | 0.4 | 3.4 | 3.8 | 1,800 | 920 | 0+ | 2 | do | do | 30 | .75 | 75 / 85 / 95 | 1 / 1 / 4 |
| 15 | TBA / Benzene | 0.5 / 9.6 | 0.1 | 0.4 | 3.4 | 3.8 | 2,000 | 920 | 0+ | 2 | do | do | 30 | .75 | 75 / 85 / 95 | 1 / 1 / 4 |
| 16 | TBA / Benzene | 1.5 / 8.6 | 0.1 | 0.4 | 3.4 | 3.6 | 400 | 160 | 0+ | 2 | do | do | 30 | .75 | 75 / 85 / 95 | 1 / 1 / 4 |
| 17 | TBA / Hexane | 2.5 / 9.5 | 0.07 | 0.28 | 3.2 | 4.2 | 2,500 | 2,400 | 1 | 2 | do | Sl. hazy | None | None | 75 / 85 | 4 / 6 |

The foregoing examples are for the sake of illustration only and can be varied considerably within the scope of the present invention in accordance with the teachings of the prior art, as the artisan will appreciate.

The present invention is applicable to the preparation of any hydroxypropyl cellulose ether which is substantially insoluble in the etherification reaction mixture.

Applicable water-immiscible dispersants, when used alone or in admixture with water-immiscible dispersants, include, e.g., those selected from the group consisting of aliphatic hydrocarbons, e.g. heptane, hexane; aromatic hydrocarbons, e.g. toluene, xylene, benzene; ketones, e.g. methyl ethyl ketone; ethers, e.g. ethyl ether, isopropyl ether; halogenated hydrocarbons, e.g. carbon tetrachloride. Applicable water-immiscible dispersants include, e.g., those selected from the group consisting of aliphatic alcohols of 2–4 carbon atoms, e.g. ethanol, n-propanol, isopropanol, n-butanol, sec-butanol, isobutanol, tert-butanol, methyl propyl carbinol, diethyl carbinol, and methyl isopropyl carbinol; dimethyl sulfoxide; dioxane; tetrahydrofuran. Hexane, heptane and toluene are preferred; mixed dispersants preferred are either of these three with isopropyl alcohol or tertiary butyl alcohol.

When using water-immiscible dispersants alone, preferably the amount will be about 5–20 parts per part cellulose. When using mixed dispersants, preferably the amount will be about 0.2–7 parts water-miscible and about 5–20 parts water-immiscible dispersant per part cellulose.

The dispersants may be added in the anhydrous form or they may be added in the aqueous form. They may be added as chemically pure compounds or in the state in which they are usually more readily available commercially. Of course, if they are added in the aqueous form, due allowance must be made so that the reaction mixture has the desired total amount of water.

For economic reasons, usually the alkali employed will be sodium hydroxide. However any of the strong alkali hydroxides, including potassium hydroxide, are suitable. Although the amount of alkali used is not critical, usually the alkali/cellulose ratio will be about 0.02–0.3 preferably 0.07–0.13, part per part cellulose.

Although the amount of water used is not critical, usually the water/cellulose ratio will be about 0.1–1.0, preferably 0.2–0.5, part per part cellulose.

As will be understood in the art, reaction temperatures and other conditions for the etherification may be varied within wide limits. For example, the etherification temperature may be varied within wide limits. For example, the etherification temperature may be about 55° C.–110° C. and the reaction time varied correspondingly, being relatively long at a low temperature and substantially shorter at a high temperature. The preferred reaction temperature is about 70° C.–95° C. As will be seen from the foregoing examples, very good results were obtained at 75° C.–95° C. and 5–10 hours. Thus, temperature and time are not critical.

As mentioned hereinbefore (1) all of the ingredients (including the etherifying agent) may be mixed together at about the same time and brought to the desired etherification temperature, whereupon the temperature is maintained and stirring is continued until the desired etherification has taken place, or (2) all of the ingredients (except the etherifying agent) may be mixed together at about 15° C.–45° C. for about 0.25–2 hours and then the etherifying agent added after which the mixture is subjected to the desired etherification conditions.

The hydroxypropyl cellulose product of the present invention is obtained in substantially the same particulate form as the starting cellulosic material and is recovered in a simple manner merely by removing the reaction medium by draining off, centrifuging, pressing, or the like. The product is readily purified by neutralizing the alkali with an acid and washing with a nonsolvent for the product, e.g. hot water (at least about 40° C.). The purified product may then be dried.

One of the important advantages of the process according to the present invention is that the same dispersant system is employed throughout. This simplifies and substantially reduces the cost of the process, and at the same time makes it possible to produce a product with quite satisfactory properties.

The starting cellulosic material for preparing the hydroxypropyl cellulose may be any appropriate raw material such as chemical cotton, cotton linters, or wood pulp of the type conventionally used in chemical reaction. The cellulosic material may be bulk dried, sheet dried, pretreated with alkali, or otherwise prepared for reduction to particles of the desired size. The cellulosic material may be ground in an attrition mill or similar device to the particle size desired, or it may be shredded, fluffed, or otherwise subdivided. In any of these forms, the cellulosic material is in a particulate form suitable for the purposes of this invention.

Granularity as disclosed herein was measured by the following procedure:

The granularity of each of the hydroxypropyl cellulose products in the examples of Tables 1 and 2 hereinbefore was compared against standards by placing solutions of the standards and said products in closed bottles, shaking the bottles vigorously for 10–15 seconds, allowing the bottles to stand for 15–20 minutes in an inverted position, comparing the granularity of the films of said product on the inside walls of the bottles with those of the standards (which films formed as the solutions flowed down the walls of the bottles) and assigning each of said products a number depending on how well said product compared with the standards, the lower the granularity number the better the solution quality of said product. A number of 2 and below was given a solution quality rating of good to excellent. A number of 3 was given a solution quality rating of fair. A number of 4 and above was given a solution quality rating of poor.

"Fibers" as disclosed herein was measured by the following procedure:

Fiber rating is based on an arbitrary set of standards well known in this art. The scale for fibers is as follows, the solution quality becoming better as the fiber rating number decreases.

| Solution quality: | Fiber rating |
|---|---|
| Worst | 5+ |
| Better | 5 |
| Better | 4 |
| Better | 3 |
| Best | 2+ |

As will be apparent from Tables 1 and 2 hereinbefore, turbidity was measured simply by visual observation.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of preparing hydroxypropyl cellulose ethers having an M.S. of at least 2 which comprises dispersing cellulosic material in a liquid dispersant selected from the group consisting of water-immiscible dispersant and mixtures of water-miscible and water-immiscible dispersant, agitating the resulting dispersion at a temperature of about 55° C.–110° C. in the presence of alkali, water, and propylene oxide, and employing the following weight ratios to cellulose:

| | |
|---|---|
| Alkali | 0.02–0.3 |
| Water | 0.1–1.0 |
| Water-immiscible dispersant | 5–20 |
| Water-miscible dispersant | 0.2–7.0 |

2. Process of claim 1 wherein the dispersant is a water-immiscible dispersant and its ratio to cellulose is 6–11.

3. Process of claim 1 wherein the dispersant is a mixture of water-immiscible and water-miscible dispersant and their ratio to cellulose is 6–11 and 1–4, respectively.

4. Process of claim 1 wherein the M.S. of said hydroxypropyl cellulose ethers is 3–5.

5. Process of claim 2 wherein the dispersant is hexane.

6. Process of claim 2 wherein the dispersant is heptane.

7. Process of claim 2 wherein the dispersant is toluene.

8. Process of claim 3 wherein the dispersant is a mixture of tertiary butyl alcohol and hexane.

9. Process of claim 3 wherein the dispersant is a mixture of tertiary butyl alcohol and heptane.

10. Process of claim 3 wherein the dispersant is a mixture of tertiary butyl alcohol and toluene.

11. Process of claim 3 wherein the dispersant is a mixture of isopropyl alcohol and hexane.

12. Process of claim 3 wherein the dispersant is a mixture of isopropyl alcohol and heptane.

13. Process of claim 3 wherein the dispersant is a mixture of isopropyl alcohol and toluene.

References Cited

UNITED STATES PATENTS

| 2,572,039 | 10/1951 | Klug et al. | 260—231 |
| 2,976,278 | 3/1961 | Paddison et al. | 260—231 |

DONALD E. CZAJA, *Primary Examiner.*

R. W. MULCAHY, *Assistant Examiner.*

UNITED STATES PATENT OFFICE
CERTIFICATE OF CORRECTION

Patent No. 3,351,583                      November 7, 1967

Robert G. Bishop

It is hereby certified that error appears in the above numbered patent requiring correction and that the said Letters Patent should read as corrected below.

Column 4, line 1, for "water-immiscible" read -- water-miscible --.

Signed and sealed this 3rd day of December 1968.

(SEAL)
Attest:

Edward M. Fletcher, Jr.                     EDWARD J. BRENNER
Attesting Officer                             Commissioner of Patents